United States Patent [19]

Hoffmann et al.

[11] Patent Number: 5,028,130
[45] Date of Patent: Jul. 2, 1991

[54] METHOD OF STRESS-OPTICAL FORCE MEASUREMENT AND MEASUREMENT DEVICE FOR PERFORMING THE METHOD

[75] Inventors: Hans J. H. G. Hoffmann, Quickborn; Gerhard Martens, Henstedt-Ulzburg, both of Fed. Rep. of Germany

[73] Assignee: U.S. Philips Corporation, New York, N.Y.

[21] Appl. No.: 407,519

[22] Filed: Sep. 15, 1989

[30] Foreign Application Priority Data

Sep. 22, 1988 [DE] Fed. Rep. of Germany ....... 3832180

[51] Int. Cl.⁵ .............................................. G01L 1/24
[52] U.S. Cl. ...................................................... 356/35
[58] Field of Search ............................. 356/33, 34, 35

[56] References Cited

U.S. PATENT DOCUMENTS 4,668,085 5/1987 Pitt et al. ..................... 356/33 X

FOREIGN PATENT DOCUMENTS 0014460 8/1980 European Pat. Off. .
0153997 2/1988 European Pat. Off. .
3129847 2/1983 Fed. Rep. of Germany .

Primary Examiner—Davis L. Willis
Assistant Examiner—Matthew W. Koren
Attorney, Agent, or Firm—Brian J. Wieghaus

[57] ABSTRACT

A method of stress-optical force measurement where a linearly polarized light ray is guided into a stress-optical measurement array consisting of several measurement members on which the force to be measured acts in a distributed manner. The light ray successively traverses the measurement members while being influenced in a force-dependent manner and is applied to a subsequent evaluation unit for evaluation. The invention also relates to a measurement device for performing the method, comprising a measurement array and an evaluation unit between two plates which are arranged in parallel at a distance from one another. The measurement array consists of at least three spaced stress-optical measurement members which keep the plates at a distance from one another, influence the light ray in a force-dependent manner, and guide the light ray into the evaluation unit arranged between two measurement members.

15 Claims, 1 Drawing Sheet

METHOD OF STRESS-OPTICAL FORCE MEASUREMENT AND MEASUREMENT DEVICE FOR PERFORMING THE METHOD

BACKGROUND OF THE INVENTION

The invention relates to a method of stress-optical force measurement in which linearly polarised light is introduced into a stress-optical measurement array which is influenced by the force to be measured, so that the polarisation state of the light is changed in a force-dependent manner and is determined in a subsequent evaluation unit. The invention also relates to a measurement device for performing the method comprising a light source for linearly polarised light, a stress-optical measurement array which is arranged between two plates which are exposed to the force to be measured, and a subsequent evaluation unit.

Various force measurement methods and devices are known.

For example, measurement devices for determining a force exerted by weight generally comprise a force sensor as well as a mechanical system consisting of levers, guide elements, springs and the like in order to transfer the force exerted by the weight of, for example an object to be weighed to the force sensor so that the transfer is independent of the position of the object on a weighing apparatus. Therefore, mechanical stability of the measurement device and measurement accuracy can be ensured only with great expenditure.

From DE-OS 29 05 314 there is known a measurement device which has a substantially simpler mechanical construction. Therein, the force exerted by the weight of the object to be weighed is transferred directly to a plurality of force sensors which at the same time stabilise the weighing apparatus or its measurement platform. In a measurement device of this kind it is problematic that the force sensors must have the same sensitivity or that the spread in their, sensitivity, customarily introduced by manufacturing tolerances, must be compensated for in an evaluation unit before the signals from the individual force sensors can be electronically added, thus ensuring independence from the position of the object to be weighed. Considerable expenditure is required for this purpose.

From DE-OS 31 29 847 there is known a method and a measurement device in which linearly polarised light is applied to the stress-optical material. The linearly polarised light is converted into elliptically polarised light when it irradiates a body exhibiting birefringence under the influence of the force to be measured. An analyser then detects a phase shift and hence indirectly the force to be measured. Application of the force to such a device comprising only one force sensor, for example in weighing apparatus, remains problematic. The use of several of such devices, comprising one force sensor each, however, involves great expenditure.

EP O 153 997 discloses a method and a device for stress-optical force measurement, for example for a weighing apparatus. Therein, linearly polarised light is applied to a stress-optical fibre, after which it is evaluated. The optical fibre is arranged in the form of a circle between two parallel plates which are arranged at a distance from one another. The force to be measured acts on one of the plates. Even though in principle a simpler construction without complex calibration is thus ensured, problems are encountered as regards the mechanical construction and the coupling-in and coupling-out of the light because of the very small thicknesses of the sensitive optical fibre.

SUMMARY OF THE INVENTION

It is an object of the present invention to provide a method of stress-optical force measurement which produces exact measurement results, substantially without requiring calibration steps for the measurement sensors, and to provide a measurement device for performing this method which is independent of mechanical guide elements and which achieves a high measurement accuracy and measurement sensitivity by utilising a stress-optical measurement array.

In order to achieve this object, the method according to the invention is characterized in that a ray of polarised light successively traverses at least three measurement members of the measurement array which are arranged at a distance from one another before it is applied to the evaluation unit, without prior individual optical adjustment of the measurement elements, the force to be measured acting on the measurement members in a distributed manner. The method according to the invention is characterised in that a light ray of the light source (17) is applied to the measurement array which comprises at least three stress-optical measurement members which are arranged at a distance from one another and which support one of the plates and bear on the other plate, which measurement members guide the polarised light ray into the evaluation unit.

The method in accordance with the invention mainly serves to measure a force exerted by weight, i.e. not a force acting in a single point. Surprisingly, it has been found that stress-optical measurement members are suitable to act as measurement sensors and at the same time as mechanical supports and optical guide elements.

In accordance with the proposed method a ray of linearly polarised light is conducted through a measurement array consisting of a plurality of stress-optical measurement members. The measurement members support a plate for accommodating the object to be weighed in a statically stable manner and are geometrically constructed and arranged at a distance from one another so that the light ray is deflected in an evaluation unit. In each of the at least three measurement members the polarisation condition of the light ray is changed in dependence of the force acting on the relevant measurement member. This force may be the same for each measurement member, but may also be a non-equal part of the overall force to be measured. In accordance with the proposed method in principle an arbitrary number of measurement elements may be provided. However, there may also be provided elements which only deflect the light ray as long as at least three stress-optical measurement members remain and no part of the force is shunted.

The light ray which is guided into the evaluation unit and which has been influenced as regards polarisation represents the sum of all individual phase shifts of the measurement members, thus representing the force to be measured. In the evaluation unit the light ray is applied to a polarisation splitter which performs a splitting operation so as to form light components which are detected by two photo diodes in order to be converted into corresponding electrical signals. For further evaluation these signals are applied to a subsequent arithmetic device, for example a self-calibrating microcomputer whose output signals can be applied to a display unit or to an appropriate interface.

The method in accordance with the invention is particularly attractive in view of optical adjustment. Because of the mechanical dimensional accuracy, i.e. the very small geometrical tolerances of the dimensions of the measurement elements, adjustment of individual measurement elements can be dispensed with. For precision measurements it is merely necessary to perform a one-time only adjustment of the entire measurement array, i.e. of all measurement members together. Indenpendently thereof, of course, the electronic circuitry must be adjusted for offset errors.

Preferably, to obtain an optimum optical working point of the stress-optical measurement members, a biasing force, for example from a spring, permanently acts on the measurement members.

According to another embodiment of the method, the linearly polarized light ray is produced by a laser diode and a collimator. After successfully passing through the stress-optical measurement members, the light ray is preferably phased-shifted in a phase-shifter and decomposed in a polarization splitter into the components of the light ray. The components of the light ray may then be converted into electrical signals for example by means of two photodiodes, in order to be applied to the arithmetic unit.

The measurement device in accordance with the invention for performing the method of stress-optical force measurement comprises two parallel plates which are situated opposite one another and at a distance from one another. When a force exerted by weight is measured, the plates are horizontally oriented. This orientation is assumed for the following description. The force to be measured acts on the upper plate. The lower plate bears on a support. Between the plates there is arranged a measurement array. This array is preferably formed by four stress-optical measurement members which are arranged at a distance from one another. The measurement members are shaped as prismatic rods comprising two parallel end faces which contact the plates, and also comprising further faces, two of which enclose an angle of 90°. The measurement members are arranged so that the latter faces of the measurement members are situated opposite one another, as shown in FIG. 1. When a different number of measurement members is used, the angular ratios should be changed accordingly, if necessary. The basic shape of the prismatic rods need not be a triangular shape. In that case it may comprise more than three corners, for as long as the deflection of the light ray still corresponds to that of a triangle. There may also be a variation or a reduction of the cross-sectional area of the prismatic rods in the part of these rods, through which the light ray passes. This serves to achieve an increased measurement sensitivity and to homogenize the stress variation in the measurement member.

Between two measurement elements and the plates there is arranged an opto-electronic unit (without shunt of force). This unit essentially comprises a light source for linearly polarised light and an evaluation unit. The source of linearly polarised light is preferably formed by a control circuit comprising a light emitting diode (LED) followed by a collimator and a polariser or comprising a laser diode and a collimator.

The light ray generated is influenced in a birefringent manner by the stress-optical measurement element and is deflected into the evaluation unit in which it is decomposed, by way of a polarisation splitter, into two mutually orthogonally linearly polarised light components which are converted into two electrical signals, preferably by means of photodiodes. In a subsequent electronic arithmetic unit, preferably comprising a self-calibrating microcomputer, these signals are processed and applied to a display unit.

In order to adjust an optimum optical working point, the polarisation splitter may be preceded by a phase shifter. The phase shifter, however, may also be arranged elsewhere in the beam path. To this end, however, use can also be made of a spring of high elasticity which is arranged approximately centrally between the plates, which spring then also serves for keeping the plates together. In a special embodiment of the invention, use is made of measurement members made of quartz glass or crown glass, because in that case, by utilizing given wavelengths, additional phase shifts can be realised in known manner by reflection of the light from the hypotenuse faces of the prismatic rods, the total phase shift already ensuring an optimum optical working point so that an additional phase shifter and a spring can be dispensed with.

The measurement members may be permanently connected to one of the plates, for example by glueing.

Furthermore, the opto-electronic unit may be arranged completely or partly outside the plates, for as long as an optically stable connection to the measurement members is ensured.

Further preferred embodiments of the present invention are disclosed under the Description of the Preferred Embodiments.

BRIEF DESCRIPTION OF THE DRAWINGS

An embodiment of a measurement device in accordance with the invention will be described, by way of example, with reference to a drawing. Therein.

DESCRIPTION OF THE PREFERRED EMBODIMENTS

Figure 1:
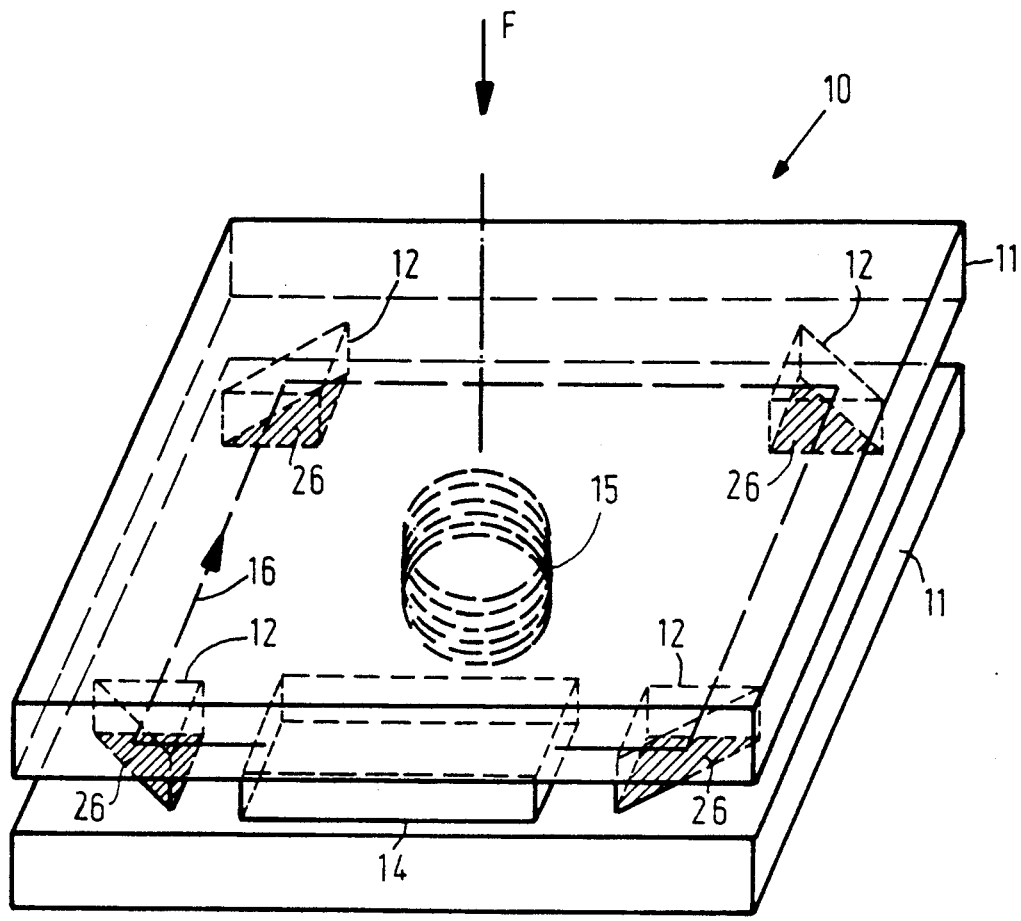
FIG. 1 is a perspective view of a measurement device in accordance with the invention for stress-optical force measurement, which device comprises four measurement members.

FIG. 1 shows a measurement device 10 for stress-optical force measurement. The force to be measured acts on the upper one of two spaced, parallel arranged plates 11 in the direction of the arrow F in FIG. 1. The plates 11 are spaced apart by way of at least three, but preferably four stress-optical measurement members 12.

The four measurement members 12 are formed as prismatic rods or right angled prisms and are arranged between the plates at such a distance from one another that their parallel faces contact the plates 11 and each of the side faces of each measurement member 12 which enclose an angle of 90° faces a corresponding side face of another measurement member 12. When a force is exerted on the plate 11, the measurement member 12 is distorted. Each measurement member 12 is permanently connected to one of the plates 11, for example by glueing, the faces 26 thereto. The measurements members are made of quartz glass, crown glass, polycarbonate or the like. The use of quartz glass or crown glass is to be preferred, because in that case a phase shifter 13 of an evaluation unit 18 (as described hereinafter) or a spring 15 between the plates 11 (as described hereinafter) can be dispensed with in a device comprising four measurement members 12.

Furthermore, when the measurement members 12 have the same construction a special advantage is achieved in that no special optical adjustment of the individual measurement members 12 is required, but only for precision measurements a single optical adjustment for the entire measurement array consisting of, for example four measurement members 12 may be necessary.

Between two measurement members 12 there is arranged an opto-electronic unit 14 in which a ray 16 of linearly polarised light is produced which irradiates the measurement members 12 in which it is influenced in a stress-induced birefringent manner, after which it is coupled into the opto-electronic unit 14 again. The angles of the prismatic measurement members 12 are to be determined in accordance with their number. The opto-electronic unit 14 may also be arranged outside the gap between the plates 11 for as long as it is connected to the measurement array in an optically stable manner.

For example, in the case of bathroom scales the force in the direction of the arrow F may be the weight of a person to be weighed but it may also be any other force to be measured. It is particularly attractive when that the upper plate 11 bears directly on the measurement members 12 because additional mechanical holding or lever elements can thus be dispensed with and the measurement array which can be simply optically adjusted or which need not be adjusted at all results in a particularly simple measurement device. In accordance with the invention unevenly distributed loads on the plate 11, and hence different distortion of the measurement members 12, lead to the same measurement result for the overall force.

Figure 2:
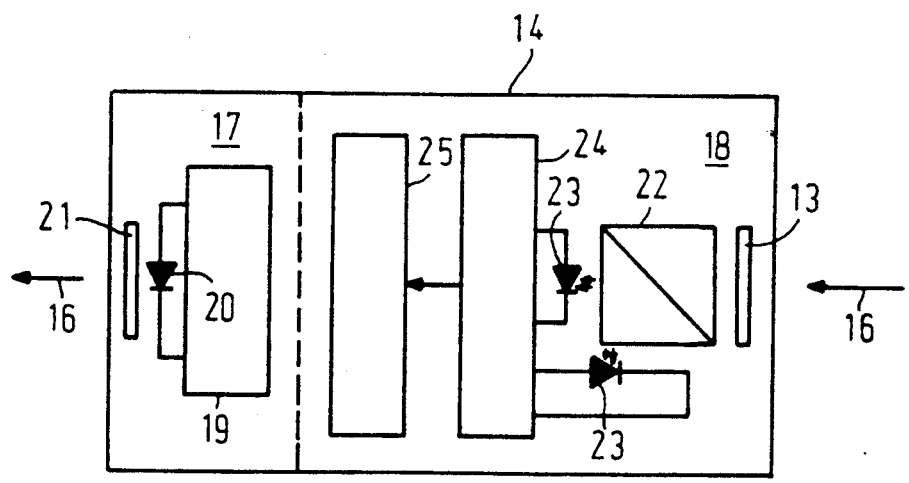
FIG. 2 shows an opto-electronic unit for generating and evaluating polarised light.

FIG. 2 diagrammatically shows the opto-electronic unit 14. It consists of a section 17 for generating a polarised light ray 16 and an evaluation unit 18. For generating the light ray the section 17 comprises a control circuit in the element 19 for controlling an LED with a polariser or a laser diode 20 with a subsequent collimator 21. After having traversed the measurement array, the light ray 16 enters the evaluation unit and passes through a phase shifter 13. This may be necessary in order to enable accurate evaluation of the polarisation state of the initially linearly polarised light ray which is then elliptically polarised by stress-induced birefringence in the measurement members 12. The optimum optical working point is thus adjusted. As has already been mentioned, instead of a phase shifter 13 use can also be made of a spring 15 having a high elasticity. This spring 15 is arranged between the plates 11 as shown in FIG. 1. The spring 15 can also serve for holding the plates 11 together. When use is made of a measurement array consisting of four measurement members 12 of, for example quartz glass or crown glass, as has already been mentioned the spring 15 as well as the phase shifter 13 can be dispensed with, because an optimum working point is then automatically obtained.

The phase shifter 13 is followed by a polarisation splitter 22. At the exit side it is coupled to two photodiodes 23 which convert the two light intensities into electrical signals. For the further processing of these electrical signals the photodiodes 23 are succeeeded by an electronic circuit comprising an arithmetic unit 24 and a display unit 25. For the arithmetic unit 24 use can be made of a self-calibrating microcomputer comprising programmable memories. It is to be noted that the electronic components must be adjusted in known manner in order to limit offset errors.

In order to reduce the current consumption the measurements can also be intermittently and automatically deactivated by the microcomputer when the measurement device is not loaded.

We claim:

1. A stress-optical force measurement device, comprising:
   (a) a light source for generating a light ray of linearly polarized light;
   (b) two opposing plates for receiving the force to be measured;
   (c) a stress-optical measurement array arranged between said two plates, said measurement array comprising at least three stress-optical measurement members, said measurement members being in contact with said opposing plates such that the force is distributed among said stress-optical measurement members; and
   (d) an evaluation unit for evaluating the polarized light, said measurement members being arranged for guiding said polarized light ray from said light source successively through said stress-optical measurement members to said evaluation unit.

2. A measurement device as claimed in claim 1, characterized in that a high elasticity spring is arranged approximately centrally between said opposing plates for biasing said plates together against said stress-optical measurement members.

3. A measurement device as claimed in claim 2, characterized in that four stress-optical measurement members form the measurement array, and said light source and said evaluation unit form an opto-electronic unit which is arranged between said plates and two of said measurement members without force being shunted.

4. A measurement device as claimed in claim 1, characterized in that a phase shifter is arranged in the light ray path of the measurement array.

5. A measurement device as claimed in claim 4, characterized in that four stress-optical measurement members form said measurement array, and said light source and said evaluation unit form an opto-electronic unit which is arranged between said plates and two of said measurement members without force being shunted.

6. A measurement device as claimed in claim 5, characterized in that the measurement members are shaped as a prismatic rod having parallel end faces, said parallel end faces bounding said plates, and each measurement member being permanently connected to one of said plates.

7. A measurement device as claimed in claim 6, characterized in that the cross-section of the measurement member between its parallel end faces varies for the same ratio of the boundary edges of this cross-section, a smallest cross-section being situated at the location of the light beam, passage.

8. A measurement device as claimed in claim 7, characterized in that the measurement members have the same construction and are made of a stress-optical material.

9. A measurement device as claimed in claim 8, characterized in that said evaluation unit comprises a polarization splitter, a pair of photodiodes for receiving a respective split beam from said splitter and outputting an electric signal proportional to the polarization of the respective beam, and a an electronic arithmetic unit for calculating a force from the electric signals from said photodiodes, and a display unit for displaying the force calculated by said arithmetic unit.

10. A measurement device as claimed in claim 1, characterized in that four stress-optical measurement members form the measurement array, and said light source and said evaluation unit form an opto-electronic unit which is arranged between said plates and two of said measurement members without force being shunted.

11. A method of stress-optical force measurement, said method comprising the steps of:
(a) providing a source of linearly polarized light;
(b) providing at least three stress-optical members each which change the state of polarization of light passing therethrough dependent on the force applied thereto;
(c) arranging said stress-optical members such that the force to be measured is distributed among said members and polarized light from said light source successively passes through said stress-optical members; and
(d) passing said polarized light successively through said stress-optical members and analyzing said light after successive passage through said stress-optical members without prior individual optical adjustment of said stress-optical measurement members.

12. A method of stress-optical force measurement according to claim 11, wherein a biasing force is permanently applied to said stress-optical members for obtaining an optimum optical working point of said stress-optical members.

13. A method of stress-optical force measurement according to claim 12, wherein said source of linearly polarized light comprises a laser diode and a collimator.

14. A method of stress-optical force measurement according to claim 13, wherein, after successively passing through said stress-optical members, said polarized light is phase-shifted and decomposed in a polarization splitter into components of the light, said components of the light then being converted into electrical signals.

15. A method of stress-optical force measurement according to claim 11, wherein, after successively passing through said stress-optical members, said polarized light is phase-shifted and decomposed in a polarization splitter into components of the light, said components of the light then being converted into electrical signals.

* * * * *